United States Patent
Matsumoto et al.

(10) Patent No.: US 10,196,579 B2
(45) Date of Patent: Feb. 5, 2019

(54) REFRIGERATOR OIL, REFRIGERATOR OIL COMPOSITION, AND REFRIGERATOR

(71) Applicant: IDEMITSU KOSAN CO., LTD., Chiyoda-ku (JP)

(72) Inventors: Tomoya Matsumoto, Funabashi (JP); Masato Kaneko, Ichihara (JP); Takashi Kondo, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 22 days.

(21) Appl. No.: 15/506,121

(22) PCT Filed: Aug. 26, 2015

(86) PCT No.: PCT/JP2015/074116
§ 371 (c)(1),
(2) Date: Feb. 23, 2017

(87) PCT Pub. No.: WO2016/031884
PCT Pub. Date: Mar. 3, 2016

(65) Prior Publication Data
US 2018/0216024 A1 Aug. 2, 2018

(30) Foreign Application Priority Data
Aug. 29, 2014 (JP) .................................. 2014-175820

(51) Int. Cl.
C09K 5/04 (2006.01)
C10M 137/04 (2006.01)
C10M 153/04 (2006.01)
C10M 169/04 (2006.01)
C10M 105/38 (2006.01)
C10M 107/24 (2006.01)
C10M 107/34 (2006.01)
C10M 171/00 (2006.01)

(52) U.S. Cl.
CPC ............. *C10M 137/04* (2013.01); *C09K 5/04* (2013.01); *C10M 105/38* (2013.01); *C10M 107/24* (2013.01); *C10M 107/34* (2013.01); *C10M 153/04* (2013.01); *C10M 169/04* (2013.01); *C10M 171/008* (2013.01); C10M 2207/026 (2013.01); C10M 2207/046 (2013.01); C10M 2207/2835 (2013.01); C10M 2209/043 (2013.01); C10M 2209/1033 (2013.01); C10M 2223/041 (2013.01); C10M 2225/00 (2013.01); C10M 2229/02 (2013.01); C10N 2220/302 (2013.01); C10N 2220/303 (2013.01); C10N 2220/305 (2013.01); C10N 2220/306 (2013.01); C10N 2230/06 (2013.01); C10N 2240/30 (2013.01)

(58) Field of Classification Search
CPC ...... C10M 2205/223; C10M 2225/025; C10M 2223/041; C10M 2225/00
See application file for complete search history.

(56) References Cited

U.S. PATENT DOCUMENTS

| | | | |
|---|---|---|---|
| 5,344,468 A | | 9/1994 | Hanlon et al. |
| 5,560,849 A | * | 10/1996 | Shankwalkar ....... C10M 169/04 508/423 |
| 8,703,674 B2 | * | 4/2014 | Umehara .............. C10M 137/04 508/423 |
| 8,722,597 B2 | * | 5/2014 | Tatsumi ............... C10M 137/00 508/364 |
| 2007/0032391 A1 | | 2/2007 | Tagawa et al. |
| 2012/0132848 A1 | | 5/2012 | Sawada et al. |
| 2012/0322706 A1 | | 12/2012 | Matsumoto et al. |

(Continued)

FOREIGN PATENT DOCUMENTS

| EP | 0 521 628 A2 | 1/1993 |
|---|---|---|
| JP | 6-128578 A | 5/1994 |

(Continued)

OTHER PUBLICATIONS

International Search Report dated Sep. 29, 2015 in PCT/JP2015/074116 filed Aug. 26, 2015.
Gaiqing Zhao et al., "Hydroquinone bis(diphenyl phosphate) as an Antiwear/Extreme Pressure Additive in Polyalkylene Glycol for Steel/Steel Contacts at Elevated Temperature", Industrial & Engineering Chemistry Research, vol. 52, 2013, pp. 7419-7424.
Japanese Office Action dated Jun. 12, 2018 in Japanese Patent Application No. 2014-175820 (with unedited computer generated English translation), 7 pages.

(Continued)

*Primary Examiner* — John R Hardee
(74) *Attorney, Agent, or Firm* — Oblon, McClelland, Maier & Neustadt, L.L.P.

(57) ABSTRACT

The refrigerator oil according to the present invention includes a base oil including an oxygen-containing organic compound and a phosphorus-based compound represented by the following general formula (1).

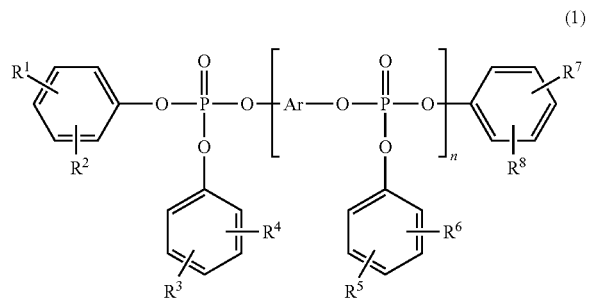

(1)

In the formula (1), n represents an integer of 1 to 10; $R^1$ to $R^8$ each independently represent a hydrogen atom or an alkyl group having 1 to 20 carbon atoms; and Ar represents a divalent hydrocarbon group having 2 to 20 carbon atoms.

13 Claims, No Drawings

(56) References Cited

U.S. PATENT DOCUMENTS

2012/0329693 A1    12/2012   Umehara et al.
2015/0048271 A1    2/2015   Kaneko et al.
2015/0307762 A1    10/2015   Saito et al.

FOREIGN PATENT DOCUMENTS

| JP | 10-130683 A | 5/1998 |
| JP | 2006-275013 A | 10/2006 |
| JP | 2010-209360 A | 9/2010 |
| JP | 2011-162766 A | 8/2011 |
| JP | 2011-178990 A | 9/2011 |
| JP | 2012-131994 A | 7/2012 |
| JP | 2013-189506 A | 9/2013 |
| WO | 2011/118708 A1 | 9/2011 |
| WO | 2014/112417 A1 | 7/2014 |

OTHER PUBLICATIONS

Notification of Reasons for Refusal dated Nov. 27, 2018, in Japanese Patent Application No. 2014-175820 filed Aug. 29, 2014 (with English translation).

\* cited by examiner

REFRIGERATOR OIL, REFRIGERATOR OIL COMPOSITION, AND REFRIGERATOR

TECHNICAL FIELD

The present invention relates to a refrigerator oil, and a refrigerator oil composition and a refrigerator in which the refrigerator oil is used.

BACKGROUND ART

In refrigerators, such as a refrigerant air conditioner, a car air conditioner, etc., refrigerants, for example, a chlorofluorocarbon (CFC), etc., have hitherto been used. However, since the CFC refrigerant is a compound containing a chlorine atom that becomes a cause of environmental problems, the refrigerant is being switched into a chlorine atom-free fluorinated hydrocarbon refrigerant, such as a hydrofluorocarbon (HFC), etc. As the HFC refrigerant, R32 (difluoroethane) and R134a (1,1,2,2-tetrafluoroethane), and furthermore, R410A (a mixture of difluoroethane and pentafluoroethane), which is a mixed refrigerant, and so on are used.

The refrigerators have a structure in which a mixture of a refrigerant and a refrigerator oil (hereinafter, the mixture is also referred to as "refrigerator oil composition") is circulated within a closed system, and therefore, compatibility with the refrigerant, stability and lubricating performance are required for the refrigerator oil. In order to easily satisfy these requirements, refrigerator oils containing, as a major component, an oxygen-containing organic compound, such as a vinyl ether compound, a polyoxyalkylene glycol, etc., are generally used with the HFC refrigerant (see, for example, PTL 1).

In addition, in order to more improve the stability and lubricating performance of the refrigerator oil, it is known to add various additives to the refrigerator oil containing, as a major component, the oxygen-containing organic compound. For example, PTL 2 discloses that a phosphorus-based compound, such as tricresyl phosphate (TCP), etc., is added to a polyoxyalkylene glycol-based refrigerator oil.

CITATION LIST

Patent Literature

PTL 1: JP 6-128578 A
PTL 2: JP 10-130683 A

SUMMARY OF INVENTION

Technical Problem

In recent years, a requirement for energy conservation is increasing in various refrigerators, and it is demanded to improve a coefficient of performance (COP). In a refrigerator oil, in order to improve the COP, in addition to improvements of the stability and lubricating performance of the refrigerator oil, it is also demanded to reduce a coefficient of friction in a sliding portion of the refrigerator. However, in the refrigerator oil having, as the phosphorus-based compound, TCP added thereto, it is difficult to thoroughly reduce the coefficient of friction, so that a more improvement is required.

In view of the foregoing problems, the present invention has been made, and a problem thereof is to reduce a coefficient of friction in a sliding portion in the case of using a refrigerator oil containing an oxygen-containing organic compound as a base oil.

Solution to Problem

The present inventors made extensive and intensive investigations, and as a result, it has been found that by incorporating a predetermined phosphorus-based compound having at least two or more phosphorus atoms in one molecule thereof into a base oil containing an oxygen-containing organic compound, a coefficient of friction in a sliding portion can be reduced, leading to accomplishment of the following [1] and [2].

[1] A refrigerator oil including: a base oil including an oxygen-containing organic compound; and a phosphorus-based compound represented by the following general formula (1).

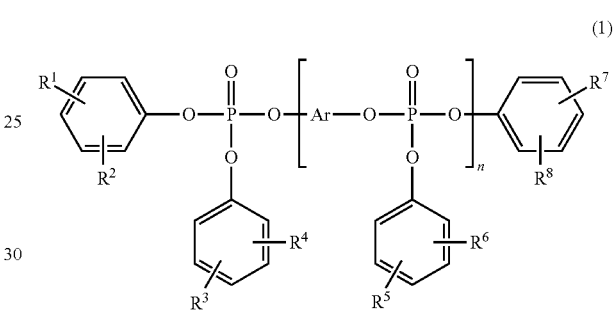

In the formula (1), n represents an integer of 1 to 10; $R^1$ to $R^8$ each independently represent a hydrogen atom or an alkyl group having 1 to 20 carbon atoms; and Ar represents a divalent hydrocarbon group having 2 to 20 carbon atoms.

[2] A method for producing a refrigerator oil including: blending a base oil including an oxygen-containing organic compound with a phosphorus-based compound represented by the foregoing general formula (1), to produce a refrigerator oil.

Advantageous Effects of Invention

In accordance with the present invention, it is possible to provide a refrigerator oil capable of reducing a coefficient of friction in a sliding portion by incorporating a predetermined phosphorus-based compound into a base oil.

DESCRIPTION OF EMBODIMENTS

The present invention is hereunder described by reference to embodiments.

The refrigerator oil according an embodiment of the present invention is a refrigerator oil containing a base oil and a phosphorus-based compound. Each of components that are contained in the refrigerator oil is hereunder described in detail.

[Base Oil]

The base oil in the present embodiment is one containing an oxygen-containing organic compound. Examples of the oxygen-containing organic compound include a synthetic oil containing an ether group, a ketone group, an ester group, a carbonate group, a hydroxyl group, or the like in a molecule thereof, and a synthetic oil containing, together with such a group, a hetero group (e.g., a sulfur atom, a phosphorus atom, a fluorine atom, a chlorine atom, a silicon atom, a nitrogen atom, etc.). More specifically, examples thereof include one or more selected from a polyvinyl ether compound (PVE), a polyoxyalkylene glycol compound (PAG), a copolymer of a poly(oxy)alkylene glycol or a monoether thereof and a polyvinyl ether (ethylene copolymer: ECP), and a polyol ester compound (POE).

Of those, one or more selected from a polyvinyl ether compound (PVE) and a polyoxyalkylene glycol compound (PAG) are preferred, and above all, one or more selected from a polyvinyl ether compound (PVE) are more preferred.

The oxygen-containing organic compound is one serving as a major component of the refrigerator oil. The oxygen-containing organic compound is preferably contained in an amount of 70 to 99.7 mass %, more preferably contained in an amount of 90 to 99.5 mass %, and still more preferably contained in an amount of 94.3 to 98.8 mass % relative to the whole amount of the refrigerator oil.

PVE, PAG, ECP, and POE, each of which is used as the base oil, are hereunder described in detail.

<Polyvinyl Ether Compound (PVE)>

The polyvinyl ether compound (PVE) is a polymer having a vinyl ether-derived constituent unit, and specifically, examples thereof include a polyvinyl-based compound having a constituent unit represented by the following general formula (A-1).

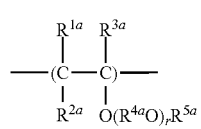

In the general formula (A-1), $R^{1a}$, $R^{2a}$, and $R^{3a}$ each independently represent a hydrogen atom or a hydrocarbon group having 1 to 8 carbon atoms, and they may be the same as or different from each other. Here, specifically, examples of the hydrocarbon group include an alkyl group, such as a methyl group, an ethyl group, an n-propyl group, an isopropyl group, an n-butyl group, an isobutyl group, a sec-butyl group, a tert-butyl group, a pentyl group of every kind, a hexyl group of every kind, a heptyl group of every kind, an octyl group of every kind, etc.; a cycloalkyl group, such as a cyclopentyl group, a cyclohexyl group, a methylcyclohexyl group of every kind, an ethylcyclohexyl group of every kind, a dimethylcyclohexyl group of every kind, etc.; an aryl group, such as a phenyl group, a methylphenyl group of every kind, an ethylphenyl group of every kind, a dimethylphenyl group of every kind, etc.; and an arylalkyl group, such as a benzyl group, a phenylethyl group of every kind, a methylbenzyl group of every kind, etc. Of those, an alkyl group is preferred. In addition, $R^{1a}$, $R^{2a}$, and $R^{3a}$ are each more preferably a hydrogen atom or an alkyl group having 3 or less carbon atoms. In the general formula (A-1), r represents a repeating number, and an average value thereof is a number ranging from 0 to 10.

$R^{4a}$ represents a divalent hydrocarbon group having 2 to 10 carbon atoms. Here, specifically, examples of the divalent hydrocarbon group having 2 to 10 carbon atoms include a divalent aliphatic hydrocarbon group, such as an ethylene group, a phenylethylene group, a 1,2-propylene group, a 2-phenyl-1,2-propylene group, a 1,3-propylene group, a butylene group of every kind, a pentylene group of every kind, a hexylene group of every kind, a heptylene group of every kind, an octylene group of every kind, a nonylene group of every kind, a decylene group of every kind, etc.; an alicyclic hydrocarbon group having two bonding sites in an alicyclic hydrocarbon such as cyclohexane, methylcyclohexane, ethylcyclohexane, dimethylcyclohexane, propylcyclohexane, etc.; a divalent aromatic hydrocarbon group, such as a phenylene group of every kind, a methylphenylene group of every kind, an ethylphenylene group of every kind, a dimethylphenylene group of every kind, a naphthylene group of every kind, etc.; an alkyl aromatic hydrocarbon group having a monovalent bonding site in each of an alkyl group moiety and an aromatic moiety of an alkyl aromatic hydrocarbon such as toluene, ethylbenzene, etc.; an alkyl aromatic hydrocarbon group having bonding sites in an alkyl group moiety of a polyalkyl aromatic hydrocarbon, such as xylene, diethylbenzene, etc.; and the like. Of those, the aliphatic hydrocarbon group having 2 to 4 carbon atoms is more preferred. Plural $R^{4a}$Os may be the same as or different from each other.

Furthermore, in the general formula (A-1), $R^{5a}$ represents a hydrocarbon group having 1 to 10 carbon atoms. Specifically, this hydrocarbon group represents an alkyl group, such as a methyl group, an ethyl group, an n-propyl group, an isopropyl group, an n-butyl group, an isobutyl group, a sec-butyl group, a tert-butyl group, a pentyl group of every kind, a hexyl group of every kind, a heptyl group of every kind, an octyl group of every kind, a nonyl group of every kind, a decyl group of every kind, etc.; a cycloalkyl group, such as a cyclopentyl group, a cyclohexyl group, a methylcyclohexyl group of every kind, an ethylcyclohexyl group of every kind, a propylcyclohexyl group of every kind, a dimethylcyclohexyl group of every kind, etc.; an aryl group, such as a phenyl group, a methylphenyl group of every kind, an ethylphenyl group of every kind, a dimethylphenyl group of every kind, a propylphenyl group of every kind, a trimethylphenyl group of every kind, a butylphenyl group of every kind, a naphthyl group of every kind, etc.; or an arylalkyl group, such as a benzyl group, a phenylethyl group of every kind, a methylbenzyl group of every kind, a phenylpropyl group of every kind, a phenylbutyl group of every kind, etc. Of those, a hydrocarbon group having 1 to 8 carbon atoms is preferred, and an alkyl group having 1 to 6 carbon atoms is more preferred. The alkyl groups may be any of straight-chain, branched, and cyclic groups.

Among the polyvinyl-based compounds having the constituent unit represented by the general formula (A-1), the polymer or copolymer containing 50 to 100 mol % of a constituent unit in which all of $R^{1a}$, $R^{2a}$, and $R^{3a}$ are a hydrogen atom, r is 0, and $R^{5a}$ is an ethyl group; and 0 to 50 mol % of a constituent unit in which all of $R^{1a}$, $R^{2a}$, and $R^{3a}$ are a hydrogen atom, r is 0, and $R^{3a}$ is an alkyl group having 3 or 4 carbon atoms is preferred. It is more preferred that the proportion of the constituent unit in which $R^{5a}$ is an ethyl group is 70 to 100 mol %, and the proportion of the constituent unit in which $R^{5a}$ is an alkyl group having 3 or 4 carbon atoms is 0 to 30 mol %; and it is still more preferred that the former is 80 to 95 mol %, and the latter is 5 to 20 mol %.

As the alkyl group having 3 or 4 carbon atoms in $R^{5a}$, an n-propyl group, an isopropyl group, an n-butyl group, an isobutyl group, a sec-butyl group, or a tert-butyl group can be used, with an isobutyl group being especially preferred.

Although the polyvinyl ether compound is one having the constituent unit represented by the general formula (A-1), a repeating number thereof may be properly chosen according to a desired kinematic viscosity. The aforementioned polyvinyl ether compound can be produced through polymerization of a corresponding vinyl ether-based monomer. The vinyl ether-based monomer that can be used herein is one represented by the following general formula (A-2).

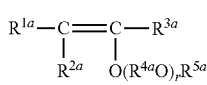 (A-2)

In the formula, $R^{1a}$, $R^{2a}$, $R^{3a}$, $R^{4a}$, $R^{5a}$ and r are the same as those mentioned above.

As this vinyl ether-based monomer, there are various monomers corresponding to the aforementioned polyvinyl ether compounds. Examples thereof include vinyl methyl ether, vinyl ethyl ether, vinyl n-propyl ether, vinyl isopropyl ether, vinyl n-butyl ether, vinyl isobutyl ether, vinyl sec-butyl ether, vinyl tert-butyl ether, vinyl n-pentyl ether, vinyl n-hexyl ether, vinyl 2-methoxyethyl ether, vinyl 2-ethoxyethyl ether, vinyl 2-methoxy-1-methylethyl ether, vinyl 2-methoxypropyl ether, vinyl 3,6-dioxaheptyl ether, vinyl 3,6,9-trioxadecyl ether, vinyl 1,4-dimethyl-3,6-dioxaheptyl ether, vinyl 1,4,7-trimethyl-3,6,9-trioxadecyl ether, vinyl 2,6-dioxa-4-heptyl ether, vinyl 2,6,9-trioxa-4-decyl ether, 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-tert-butoxy-2-butene, and the like. These vinyl ether-based monomers can be produced by a known method.

In an end moiety of the polymer represented by the general formula (A-1), a monovalent group derived from a saturated hydrocarbon, an ether, an alcohol, a ketone, an amide, a nitrile, or the like may be introduced by a known method.

Above all, as the polyvinyl ether compound, those having an end structure of each of the following (1) to (4) are suitable.

(1) A compound in which one end thereof is represented by the following general formula (A-1-i), and the remaining end is represented by the following general formula (A-1-ii).

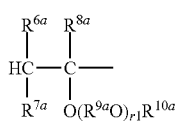 (A-1-i)

In the formula, $R^{6a}$, $R^{7a}$, and $R^{8a}$ each independently represent a hydrogen atom or a hydrocarbon group having 1 to 8 carbon atoms, and they may be the same as or different from each other; $R^{9a}$ represents a divalent hydrocarbon group having 2 to 10 carbon atoms; $R^{10a}$ represents a hydrocarbon group having 1 to 10 carbon atoms; r1 represents a number of 0 to 10 in terms of an average value thereof; and in the case where plural $R^{9a}$Os are present, the plural $R^{9a}$Os may be the same as or different from each other.

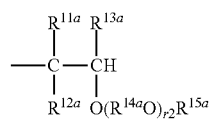 (A-1-ii)

In the formula, $R^{11a}$, $R^{12a}$, and $R^{13a}$ each independently represent a hydrogen atom or a hydrocarbon group having 1 to 8 carbon atoms, and they may be the same as or different from each other; $R^{14a}$ represents a divalent hydrocarbon group having 2 to 10 carbon atoms; $R^{15a}$ represents a hydrocarbon group having 1 to 10 carbon atoms; r2 represents a number of 0 to 10 in terms of an average value thereof; and in the case where plural $R^{14a}$Os are present, the plural $R^{14a}$Os may be the same as or different from each other.

(2) A compound in which one end thereof is represented by the foregoing general formula (A-1-i), and the remaining end is represented by the following general formula (A-1-iii);

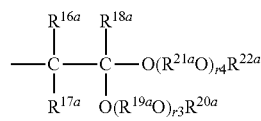 (A-1-iii)

In the formula, $R^{16a}$, $R^{17a}$, and $R^{18a}$ each independently represent a hydrogen atom or a hydrocarbon group having 1 to 8 carbon atoms, and they may be the same as or different from each other; $R^{19a}$ and $R^{21a}$ each independently represent a divalent hydrocarbon group having 2 to 10 carbon atoms, and they may be the same as or different from each other; $R^{20a}$ and $R^{22a}$ each independently represent a hydrocarbon group having 1 to 10 carbon atoms, and they may be the same as or different from each other; r3 and r4 each represent a number of 0 to 10 in terms of an average value thereof, they may be the same as or different from each other; in the case where plural $R^{19a}$Os are present, the plural $R^{19a}$Os may be the same as or different from each other; and in the case where plural $R^{21a}$Os are present, the plural $R^{21a}$Os may be the same as or different from each other.

(3) A compound in which one end thereof is represented by the foregoing general formula (A-1-i), and the remaining end has an olefinic unsaturated bond:

(4) A compound in which one end thereof is represented by the foregoing general formula (A-1-i), and the remaining end is represented by the following general formula (A-1-iv):

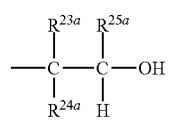 (A-1-iv)

In the formula, $R^{23a}$, $R^{24a}$, and $R^{25a}$ each represent a hydrogen atom or a hydrocarbon group having 1 to 8 carbon atoms, and they may be the same as or different from each other.

The polyvinyl ether compound may also be a mixture of two or more selected from those having an end structure of each of the foregoing (1) to (4). Suitable examples of such a mixture may include a mixture of the compound having the end structure of the foregoing (1) and the compound having the end structure of the foregoing (4); and a mixture of the compound having the end structure of the foregoing (2) and the compound having the end structure of the foregoing (3).

As for the polyvinyl ether compound, it is preferred to choose a degree of polymerization, an end structure, and so on so as to have a preferred viscosity range as mentioned later. The polyvinyl ether compound may be used solely, or it may be used in combination of two or more thereof.

Among the polyvinyl-based compounds having the constituent unit represented by the general formula (A-1), in particular, a compound in which one end thereof is presented by the general formula (A-1-i), and the remaining end is represented by the general formula (A-1-ii) is preferred.

Above all, it is more preferred that in the formulae (A-1-i) and (A-1-ii), all of $R^{6a}$, $R^{7a}$, $R^{8a}$, $R^{11a}$, $R^{12a}$, and $R^{13a}$ are a hydrogen atom, all of r1 and r2 are 0, and $R^{10a}$ and $R^{15a}$ are each an alkyl group having 1 to 4 carbon atoms.

<Polyoxyalkylene Glycol Compound (PAG)>

Examples of the polyoxyalkylene glycol compound (PAG) include a compound represented by the following general formula (B-1). In the case where PAG is contained in the base oil, the PAG may be used either solely or in combination of two or more kinds thereof.

$$R^{1b}-[(OR^{2b})_m-OR^{3b}]_n \qquad (B-1)$$

In the formula, $R^{1b}$ represents a hydrogen atom, a monovalent hydrocarbon group having 1 to 10 carbon atoms, an acyl group having 2 to 10 carbon atoms, a hydrocarbon group having 2 to 6 bonding sites and having 1 to 10 carbon atoms, or an oxygen-containing hydrocarbon group having 1 to 10 carbon atoms; $R^{2b}$ represents an alkylene group having 2 to 4 carbon atoms; $R^{3b}$ represents a hydrogen atom, a hydrocarbon group having 1 to 10 carbon atoms, an acyl group having 2 to 10 carbon atoms, or an oxygen-containing hydrocarbon group having 1 to 10 carbon atoms; n represents an integer of 1 to 6; and m represents a number of 6 to 80 in terms of an average value of (m×n).

In the general formula (B-1), the monovalent hydrocarbon group having 1 to 10 carbon atoms in each of $R^{1b}$ and $R^{3b}$ may be any of straight-chain, branched, and cyclic groups. The hydrocarbon group is preferably an alkyl group, and specific examples thereof may include a methyl group, an ethyl group, an n-propyl group, an isopropyl group, a butyl group of every kind, a pentyl group of every kind, a hexyl group of every kind, a heptyl group of every kind, an octyl group of every kind, a nonyl group of every kind, a decyl group of every kind, a cyclopentyl group, a cyclohexyl group, and the like. As for the aforementioned monovalent hydrocarbon group, when the number of carbon atoms is 10 or less, the compatibility with the refrigerant becomes good. From such a viewpoint, the number of carbon atoms of the monovalent hydrocarbon group is more preferably 1 to 4.

The hydrocarbon group moiety which the acyl group having 2 to 10 carbon atoms in each of $R^{1b}$ and $R^{3b}$ has may be any of straight-chain, branched, and cyclic groups. The hydrocarbon group moiety of the acyl group is preferably an alkyl group, and specific examples thereof include those having 1 to 9 carbon atoms among the alkyl groups which may be chosen as the aforementioned $R^{1b}$ and $R^{3b}$. When the number of carbon atoms of the acyl group is 10 or less, the compatibility with the refrigerant becomes good. The number of carbon atoms of the acyl group is preferably 2 to 4.

In the case where all of $R^{1b}$ and $R^{3b}$ are a hydrocarbon group or an acyl group, $R^{1b}$ and $R^{3b}$ may be the same as or different from each other.

Furthermore, in the case where n is 2 or more, plural $R^{3b}$s in one molecule may be the same as or different from each other.

In the case where $R^{1b}$ is the hydrocarbon group having 2 to 6 bonding sites and having 1 to 10 carbon atoms, this hydrocarbon group may be either linear or cyclic. The hydrocarbon group having 2 bonding sites is preferably an aliphatic hydrocarbon group, and examples thereof include an ethylene group, a propylene group, a butylene group, a pentylene group, a hexylene group, a heptylene group, an octylene group, a nonylene group, a decylene group, a cyclopentylene group, a cyclohexylene group, and the like. Examples of the other hydrocarbon groups may include residues resulting from removing a hydroxyl group from a bisphenol compound such as bisphenol, bisphenol F, bisphenol A, etc. The hydrocarbon group having 3 to 6 bonding sites is preferably an aliphatic hydrocarbon group, and examples thereof may include residues resulting from removing a hydroxyl group from a polyhydric alcohol, such as trimethylolpropane, glycerin, pentaerythritol, sorbitol, 1,2,3-trihydroxycyclohexane, 1,3,5-trihydroxycyclohexane, etc.

When the number of carbon atoms of this aliphatic hydrocarbon group is 10 or less, the compatibility with the refrigerant becomes good. The number of carbon atoms of this aliphatic hydrocarbon group is preferably 2 to 6.

Furthermore, examples of the oxygen-containing hydrocarbon group having 1 to 10 carbon atoms in each of $R^{1b}$ and $R^{3b}$ may include an ether bond-containing linear or cyclic aliphatic group (for example, a tetrahydrofurfuryl group), and the like.

At least one of $R^{1b}$ and $R^{3b}$ is preferably an alkyl group, especially an alkyl group having 1 to 4 carbon atoms.

$R^{2b}$ in the general formula (B-1) is an alkylene group having 2 to 4 carbon atoms, and examples of the oxyalkylene group as a repeating unit include an oxyethylene group, an oxypropylene group, and an oxybutylene group. The oxyalkylene groups in one molecule may be the same as each other, and two or more kinds of oxyalkylene groups may also be contained. It is preferred that at least an oxypropylene unit is contained in one molecule, and it is more preferred that 50 mol % or more of an oxypropylene unit is contained in the oxyalkylene unit.

In the general formula (B-1), n is an integer of 1 to 6 and is determined according to the number of bonding sites of $R^{1b}$. For example, in the case where $R^{1b}$ is an alkyl group or an acyl group, then n is 1; and in the case where $R^{1b}$ is an aliphatic hydrocarbon group having 2, 3, 4, 5, or 6 bonding sites, then n is 2, 3, 4, 5, or 6, respectively. m is a number of 6 to 80 in terms of an average value of (m×n). When the foregoing average value is 80 or less, the compatibility becomes good. n is preferably an integer of 1 to 3, and more preferably 1. However, it is preferred that the average value of (m×n) is properly set such that a viscosity of the base oil as mentioned later falls within a desired range.

The polyoxyalkylene glycol compound represented by the general formula (B-1) may include a polyoxyalkylene glycol having a hydroxyl group in an end thereof, and so long as the content of the hydroxyl group is a proportion of 50 mol % or less relative to the whole of end groups, even when such a polyoxyalkylene glycol is contained, it can be suitably used.

<Copolymer of Poly(Oxy)Alkylene Glycol or Monoether Thereof and Polyvinyl Ether>

In the refrigerator oil of the present embodiment, examples of the copolymer of a poly(oxy)alkylene glycol or a monoether thereof and polyvinyl ether that can be used as the base oil include a copolymer represented by the following general formula (C-1) and a copolymer represented by the following general formula (C-2) (hereinafter referred to as "polyvinyl ether copolymer I" and "polyvinyl ether copolymer II", respectively). The poly(oxy)alkylene glycol refers to both a polyalkylene glycol and a polyoxyalkylene glycol.

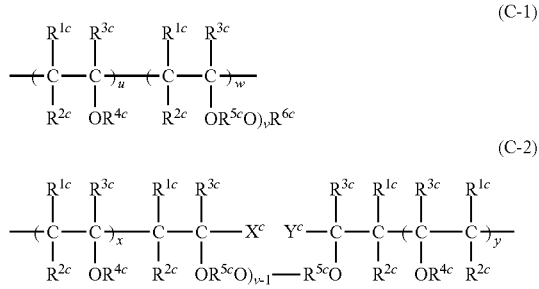

In the general formula (C-1), $R^{1c}$, $R^{2c}$, and $R^{3c}$ each independently represent a hydrogen atom or a hydrocarbon group having 1 to 8 carbon atoms, and they may be the same as or different from each other; $R^{5c}$ represents a divalent hydrocarbon group having 2 to 4 carbon atoms; $R^{6c}$ represents an aliphatic or alicyclic hydrocarbon group having 1 to 20 carbon atoms, an aromatic hydrocarbon group having 1 to 20 carbon atoms which may have a substituent, an acyl group having 2 to 20 carbon atoms, or an oxygen-containing hydrocarbon group having 2 to 50 carbon atoms; $R^{4c}$ represents a hydrocarbon group having 1 to 10 carbon atoms; and in the case where a plurality of each of $R^{1c}$ to $R^{6c}$ are present, they may be each the same as or different from each other.

Here, specifically, the hydrocarbon group having 1 to 8 carbon atoms in $R^{1c}$ to $R^{3c}$ represents an alkyl group, such as a methyl group, an ethyl group, an n-propyl group, an isopropyl group, an n-butyl group, an isobutyl group, a sec-butyl group, a tert-butyl group, a pentyl group of every kind, a hexyl group of every kind, a heptyl group of every kind, an octyl group of every kind, etc.; a cyclopentyl group, a cyclohexyl group, a methylcyclohexyl group of every kind, an ethylcyclohexyl group of every kind, a dimethylcyclohexyl group of every kind, an aryl group such as a dimethylphenyl group of every kind, etc.; or an arylalkyl group, such as a benzyl group, a phenylethyl group, a methylbenzyl group of every kind, etc. In particular, $R^{1c}$, $R^{2c}$, and $R^{3c}$ are each preferably a hydrogen atom.

Meanwhile, specifically, the divalent hydrocarbon group having 2 to 4 carbon atoms as represented by $R^{5c}$ is a divalent alkylene group, such as a methylene group, an ethylene group, a propylene group of every kind, a butylene group of every kind, etc.

In the general formula (C-1), v represents a repeating number of $R^{5c}O$, and is a number ranging from 1 to 50, preferably from 1 to 20, more preferably from 1 to 10, and especially preferably from 1 to 5 in terms of an average value thereof. In the case where plural $R^{5c}$Os are present, the plural $R^{5c}$Os may be the same as or different from each other. v may be the same as or different from each other in every constituent unit.

w represents a number of 1 to 50, preferably 1 to 10, more preferably 1 to 2, and especially preferably 1; u represents a number of 0 to 50, preferably 2 to 25, and more preferably 5 to 15; and in the case where a plurality of each of w and u are present, they may be either block or random.

Furthermore, in the general formula (C-1), $R^{6c}$ preferably represents an alkyl group having 1 to 10 carbon atoms, an acyl group having 2 to 10 carbon atoms, or an oxygen-containing hydrocarbon group having 2 to 50 carbon atoms.

Specifically, this alkyl group having 1 to 10 carbon atoms represents a methyl group, an ethyl group, an n-propyl group, an isopropyl group, an n-butyl group, an isobutyl group, a sec-butyl group, a tert-butyl group, a pentyl group of every kind, a hexyl group of every kind, a heptyl group of every kind, an octyl group of every kind, a nonyl group of every kind, a decyl group of every kind, a cyclopentyl group, a cyclohexyl group, a methylcyclohexyl group of every kind, an ethylcyclohexyl group of every kind, a propylcyclohexyl group of every kind, a dimethylcyclohexyl group of every kind, or the like.

Examples of the acyl group having 2 to 10 carbon atoms include an acetyl group, a propionyl group, a butyryl group, an isobutyryl group, a valeryl group, an isovaleryl group, a pivaloyl group, a benzoyl group, a toluoyl group, and the like.

Furthermore, a methoxymethyl group, a methoxyethyl group, a methoxypropyl group, a 1,1-bismethoxypropyl group, a 1,2-bismethoxypropyl group, an ethoxypropyl group, a (2-methoxyethoxy)propyl group, a (1-methyl-2-methoxy)propyl group, and the like are preferably exemplified as specific examples of the oxygen-containing hydrocarbon group having 2 to 50 carbon atoms.

In the general formula (C-1), specifically, the hydrocarbon group having 1 to 10 carbon atoms as represented by $R^{4c}$ represents an alkyl group, such as a methyl group, an ethyl group, an n-propyl group, an isopropyl group, an n-butyl group, an isobutyl group, a pentyl group of every kind, a hexyl group of every kind, a heptyl group of every kind, an octyl group of every kind, a nonyl group of every kind, a decyl group of every kind, etc.; a cycloalkyl group, such as a cyclopentyl group, a cyclohexyl group, a methylcyclohexyl group of every kind, an ethylcyclohexyl group of every kind, a propylcyclohexyl group of every kind, a dimethylcyclohexyl group of every kind, etc.; an aryl group, such as a phenyl group, a methylphenyl group of every kind, an ethylphenyl group of every kind, a dimethylphenyl group of every kind, a propylphenyl group of every kind, a trimethylphenyl group of every kind, a butylphenyl group of every kind, a naphthyl group of every kind, etc.; an arylalkyl group, such as a benzyl group, a phenylethyl group of every kind, a methylbenzyl group of every kind, a phenylpropyl group of every kind, a phenylbutyl group of every kind, etc.; or the like.

The polyvinyl ether copolymer I having the constituent unit represented by the general formula (C-1) is able to improve lubricating properties, insulating properties, hygroscopicity, and so on while satisfying the compatibility through formation of the copolymer.

Meanwhile, in the polyvinyl ether copolymer II represented by the general formula (C-2), $R^{1c}$ to $R^{5c}$ and v are the same as those mentioned above. In the case where a plurality of each of $R^{4c}$ and $R^{5c}$ are present, they may be each the same as or different from each other. x and y each represent a number of 1 to 50, and in the case where a plurality of each of x and y are present, they may be either block or random.

$X^c$ and $Y^c$ each independently represent a hydrogen atom, a hydroxyl group, or a hydrocarbon group having 1 to 20 carbon atoms.

It is preferred that the repeating numbers u, w, x, and y in the general formulae (C-1) and (C-2) are properly chosen such that a desired viscosity as mentioned later is obtained. A production method of each of the polyvinyl ether copolymers I and II is not particularly limited so long as it is a method for which each of the polyvinyl ether copolymers I and II is obtained.

The vinyl ether-based copolymer I represented by the general formula (C-1) can be formed into the polyvinyl ether copolymer I having a structure in which one end thereof is represented by the following general formula (C-3) or (C-4), and the remaining end is represented by the following general formula (C-5) or (C-6).

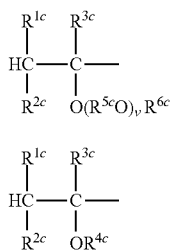

(C-3)

(C-4)

In the aforementioned (C-3) and (C-4), $R^{1c}$ to $R^{6c}$ and v are the same as those as mentioned above.

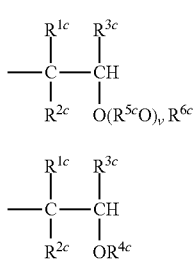

(C-5)

(C-6)

In the aforementioned (C-5) and (C-6), $R^{1c}$ to $R^{6c}$ and v are the same as those as mentioned above.

<Polyol Ester Compound>

In the refrigerator oil, as the polyol ester compound that can be used as the base oil, an ester of a diol or a polyol having 3 to 20 hydroxyl groups and a fatty acid having about 1 to 24 carbon atoms is preferably used. Here, examples of the diol include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, 1,12-dodecanediol, and the like. Examples of the polyol include a polyhydric alcohol, such as trimethylolethane, trimethylolpropane, trimethylolbutane, di-(trimethylolpropane), tri-(trimethylolpropane), pentaerythritol, di-(pentaerythritol), tri-(pentaerythritol), glycerin, a polyglycerin (e.g., dimer to icosamer of glycerin), 1,3,5-pentanetriol, sorbitol, sorbitan, a sorbitol glycerin condensate, adonitol, arabitol, xylitol, mannitol, etc.; a saccharide, such as xylose, arabinose, ribose, rhamnose, glucose, fructose, galactose, mannose, sorbose, cellobiose, maltose, isomaltose, trehalose, sucrose, raffinose, gentianose, merenditose, etc.; a partially etherified product thereof; a methyl glucoside (a glucoside); and the like. Above all, hindered alcohols, such as neopentyl glycol, trimethylolethane, trimethylolpropane, trimethylolbutane, di-(trimethylolpropane), tri-(trimethylolpropane), pentaerythritol, di-(pentaerythritol), tri-(pentaerythritol), etc., are preferred as the polyol.

As for the fatty acid, though the number of carbon atoms is not particularly limited, those having 1 to 24 carbon atoms are typically used. Among the fatty acids having 1 to 24 carbon atoms, those having 3 or more carbon atoms are preferred, those having 4 or more carbon atoms are more preferred, and those having 5 or more carbon atoms are still more preferred from standpoint of lubricating properties. Those having 18 or less carbon atoms are preferred, those having 12 or less carbon atoms are more preferred, and those having 9 or less carbon atoms are still more preferred from the standpoint of compatibility with the refrigerant.

The fatty acid may be any of a straight-chain fatty acid and a branched fatty acid, a straight-chain fatty acid is preferred from the standpoint of lubricating properties, and a branched fatty acid is preferred from the standpoint of hydrolysis stability. Furthermore, the fatty acid may be any of a saturated fatty acid and an unsaturated fatty acid.

Examples of the fatty acid include a straight-chain or branched fatty acid, such as isobutyric acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, oleic acid, etc.; a so-called neo acid in which an α-carbon atom is quaternary; and the like. More specifically, isobutyric acid, valeric acid (n-pentanoic acid), caproic acid (n-hexanoic acid), enanthic acid (n-heptanoic acid), caprylic acid (n-octanoic acid), pelargonic acid (n-nonanoic acid), capric acid (n-decanoic acid), oleic acid (cis-9-octadecenoic acid), isopentanoic acid (3-methylbutanoic acid), 2-methylhexanoic acid, 2-ethylpentanoic acid, 2-ethylhexanoic acid, 3,5,5-trimethylhexanoic acid, and the like are preferred.

The polyol ester may be a partial ester in which some of the hydroxyl groups of a polyol remain without being esterified, may be a complete ester in which all of the hydroxyl groups of the polyol are esterified, or may be a mixture of the partial ester and the complete ester, but the polyol ester is preferably the complete ester.

Among these polyol esters, an ester of a hindered alcohol, such as neopentyl glycol, trimethylolethane, trimethylolpropane, trimethylolbutane, di-(trimethylolpropane), tri-(trimethylolpropane), pentaerythritol, di-(pentaerythritol), tri-(pentaerythritol), etc., is more preferred, and an ester of neopentyl glycol, trimethylolethane, trimethylolpropane, trimethylolbutane, or a pentaerythritol is still more preferred, because such an ester is more excellent in hydrolysis stability. An ester of pentaerythritol is most preferred because it is especially excellent in compatibility with the refrigerant and hydrolysis stability.

Specific examples of the preferred polyol ester include a diester of neopentyl glycol and one or more fatty acids selected from isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolethane and one or more fatty acids selected from isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolpropane and one or more fatty acids selected from isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolbutane and one or more fatty acids selected from isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; and a tetraester of pentaerythritol and one or more fatty acids selected from isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid.

The ester of two or more fatty acids may be a mixture of two or more esters of one fatty acid and a polyol, and an ester of a mixed fatty acid of two or more kinds thereof and a polyol. Particularly an ester of a mixed fatty acid and a polyol is excellent in low-temperature properties and compatibility with the refrigerant.

It is preferred that a kinematic viscosity at 40° C. of the base oil that is contained in the refrigerator oil is 5 to 150 mm$^2$/s. When this kinematic viscosity is 5 mm$^2$/s or more, not only a good lubricating performance is exhibited, but also sealing properties are good. When the kinematic viscosity is 150 mm$^2$/s or less, compatibility between the refrigerant and the refrigerator oil is excellent, and energy saving properties are good. From the foregoing viewpoints, the kinematic viscosity at 40° C. of the base oil is more preferably 10 to 120 mm$^2$/s, and still more preferably 20 to 100 mm$^2$/s.

So long as the object of the present invention is not impaired, the base oil may contain a mineral oil, a synthetic oil other than the aforementioned oxygen-containing organic compound, or both thereof. The content of the base oil other than the aforementioned oxygen-containing organic compound is preferably less than 10 mass %, more preferably less than 5 mass %, and still more preferably less than 1 mass % relative to the whole amount of the refrigerator oil.

[Phosphorus-Based Compound]

The phosphorus-based compound that is contained in the refrigerator oil of the present embodiment is one represented by the following general formula (1).

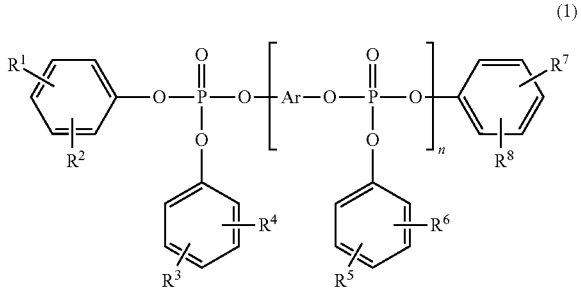

(1)

In the formula (1), n represents an integer of 1 to 10; $R^1$ to $R^8$ each independently represent a hydrogen atom or an alkyl group having 1 to 20 carbon atoms; and Ar represents a divalent hydrocarbon group having 2 to 20 carbon atoms.

In the present embodiment, by incorporating the aforementioned phosphorus-based compound into the base oil containing the oxygen-containing organic compound, it is possible to reduce a coefficient of friction in a sliding portion while maintaining the stability and lubricating performance of the refrigerator oil.

In the general formula (1), the alkyl group in each of $R^1$ to $R^8$ may be any of straight-chain, branched, and cyclic groups, and examples thereof include a methyl group, an ethyl group, an n-propyl group, an isopropyl group, a butyl group of every kind, a pentyl group of every kind, a hexyl group of every kind, a heptyl group of every kind, an octyl group of every kind, a nonyl group of every kind, a decyl group of every kind, an undecyl group of every kind, a dodecyl group of every kind, a tridecyl group of every kind, a tetradecyl group of every kind, a pentadecyl group of every kind, a hexadecyl group of every kind, a heptadecyl group of every kind, an octadecyl group of every kind, and the like.

$R^1$ to $R^8$ are each preferably a hydrogen atom or an alkyl group having 1 to 4 carbon atoms, more preferably a hydrogen atom or a methyl group, and most preferably a hydrogen atom.

In the general formula (1), Ar is preferably an alkylene group, an arylene group, or a hydrocarbon group consisting of an arylene group and an alkylene group, and it is preferred that Ar contains an arylene group. In the case where Ar is an alkylene group, examples of the alkylene group include an ethylene group, a propylene group, a butylene group, a pentylene group, a hexylene group, a heptylene group, an octylene group, a nonylene group, a decylene group, an undecylene group, a dodecylene group, a tetradecylene group, a hexadecylene group, an octadecylene group, an icosalene group, and the like; these alkylene groups may be a straight-chain alkylene group or may be a branched alkylene group of every kind. The alkylene group may also be a cyclic alkylene group, such as a cyclopropylene group, a cyclobutylene group, a cyclopentylene group, a cyclohexylene group, a cycloheptylene group, a cyclooctylene group, a dicyclopentylene group, a tricyclopentylene group, etc.

The arylene group may be either substituted or unsubstituted. Specifically, examples thereof include a substituted or unsubstituted phenylene group, a substituted or unsubstituted naphthylene group, a substituted or unsubstituted biphenyl group, and the like, but the arylene group is preferably unsubstituted. Of those, a phenylene group is preferred.

Furthermore, in the case where Ar consists of an arylene group and an alkylene group, examples of the arylene group are the same as those mentioned above; and examples of the alkylene group include a straight-chain, branched, or cyclic alkylene group having 1 to 14 carbon atoms, and for example, a methylene group or the same alkylene groups as mentioned above may be used. The alkylene group is preferably a straight-chain or branched alkylene group having 1 to 5 carbon atoms, and specifically, examples thereof include a methylene group, an ethylene group of every kind, such as 1,1-ethylene, 1,2-ethylene, etc., a propylene group of every kind, such as 1,3-propylene, 1,2-propylene, 2,2-propylene, etc.; a butylene group of every kind, and a pentylene group of every kind. Of those, a 2,2-propylene group (—C(CH$_3$)$_2$—) is more preferred.

In the general formula (1), n is preferably 1 to 8. The phosphorus-based compound may be a single material in which n is composed of a specified single kind, or may be a mixture in which n is composed of specified two or more kinds. Here, when the phosphorus-based compound is a single material in which n is 1, the molecular weight is small, so that the solubility in the base oil is easily increased. In addition, the coefficient of friction is easily reduced.

As suitable specific examples of Ar, a group represented by the following general formulae (2) to (4) is preferred, and in order to more effectively reduce the coefficient of friction, a group represented by the following general formula (2) or (3) is more preferred. The general formula (2) may be any of ortho, meta, and para, with meta being preferred.

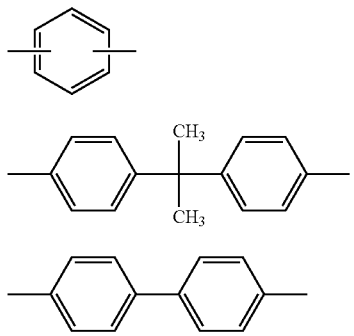

Specific examples of the preferred phosphorus-based compound include compounds represented by the following general formulae (5) and (6).

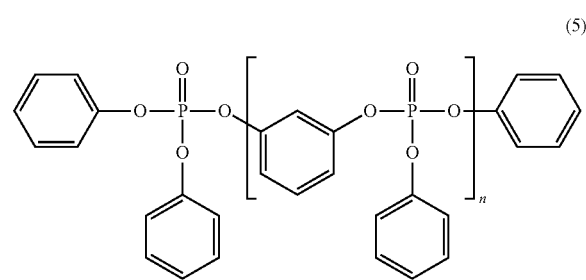

In the formula (5), n represents an integer of 1 to 10, preferably 1 to 8, and more preferably 1.

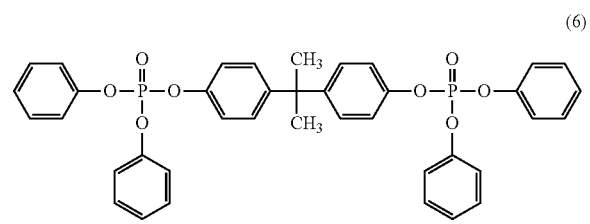 [SMILES: CC(C)(c1ccc(OP(=O)(Oc2ccccc2)Oc2ccccc2)cc1)c1ccc(OP(=O)(Oc2ccccc2)Oc2ccccc2)cc1]

The content of the phosphorus-based compound that is used in the present embodiment is preferably 0.3 to 10.0 mass % relative to the whole amount of the refrigerator oil. In the present embodiment, by incorporating the phosphorus-based compound in an amount of 0.3 mass % or more, it is possible to effectively reduce the coefficient of friction in a sliding portion while maintaining the stability and lubricating performance of the refrigerator oil. By controlling the content of the phosphorus-based compound to 10.0 mass % or less, it becomes easy to dissolve the phosphorus-based compound in the base oil, and the effect corresponding to the amount is easily exhibited.

Here, taking into consideration the matter that the coefficient of friction in a sliding portion is effectively reduced, the lower limit value of the content of the phosphorus-based compound is more preferably 0.5 mass %, still more preferably 1.0 mass %, and especially preferably 2.0 mass %. Taking into consideration the stability of the refrigerator oil, the upper limit value of the content of the phosphorus-based compound is more preferably 8 mass %, and still more preferably 5 mass %.

[Other Additives]

The refrigerator oil according to the present embodiment may further contain, in addition to the aforementioned phosphorus-based compound, one or more various additives, such as an antioxidant, an acid scavenger, a defoaming agent, an extreme pressure agent, an oiliness agent, an oxygen scavenger, a metal deactivator, a rust preventive, etc. Above all, it is preferably to contain one or more selected from an antioxidant, an acid scavenger, and a defoaming agent. The additive other than the phosphorus-based compound is contained in an amount of preferably 15 mass % or less, and more preferably about 0 to 5 mass % relative to the whole amount of the refrigerator oil.

Examples of the antioxidant include a phenol-based antioxidant, such as 2,6-di-tert-butyl-4-methylphenol, 2,6-di-tert-butyl-4-ethylphenol, 2,2'-methylenebis(4-methyl-6-tert-butylphenol), etc.; and an amine type antioxidant, such as phenyl-α-naphthylamine, N,N'-di-phenyl-p-phenylenediamine, etc., and a phenol-based antioxidant is preferred. From the standpoints of effects and economy, and so on, the content of the antioxidant is typically 0.01 to 5 mass %, and preferably 0.05 to 3 mass % relative to the whole amount of the refrigerator oil.

Examples of the acid scavenger may include an epoxy compound, such as phenyl glycidyl ether, an alkyl glycidyl ether, an alkylene glycol glycidyl ether, cyclohexene oxide, an α-olefin oxide, an epoxidized soybean oil, etc. Above all, from the standpoint of compatibility, phenyl glycidyl ether, an alkyl glycidyl ether, an alkylene glycol glycidyl ether, cyclohexene oxide, and an α-olefin oxide are preferred.

The alkyl group in the alkyl glycidyl ether and the alkylene group in the alkylene glycol glycidyl ether may be each branched, and the number of carbon atoms thereof is typically 3 to 30, preferably 4 to 24, and especially preferably 6 to 16. As for the α-olefin oxide, one having a total number of carbon atoms of generally 4 to 50, preferably 4 to 24, and especially 6 to 16 is used. In the present embodiment, the acid scavenger may be used solely, or may be used in combination of two or more thereof. The content thereof is typically 0.005 to 5 mass %, and preferably 0.05 to 3 mass % relative to the whole amount of the refrigerator oil from the standpoints of effects and inhibition of sludge generation.

In the present embodiment, by containing the acid scavenger, the stability of the refrigerator oil can be improved.

Examples of the defoaming agent may include a silicone oil, a fluorinated silicone oil, and the like. The content of the defoaming agent is typically 0.005 to 2 mass %, and preferably 0.01 to 1 mass % relative to the whole amount of the refrigerator oil.

Examples of the extreme pressure agent may include a phosphorus-based extreme pressure agent, such as a phosphate ester, an acidic phosphate ester, a phosphite ester, an acidic phosphite ester, and an amine salt thereof, etc.

Such a phosphorus-based extreme pressure agent is one having one phosphorus atom in a molecule thereof, and from the standpoints of extreme pressure properties, friction properties, and so on, examples thereof include tricresyl phosphate, trithiophenyl phosphate, tri(nonylphenyl) phosphite, dioleyl hydrogenphosphite, 2-ethylhexyldiphenyl phosphite, and the like.

In addition, examples of the extreme pressure agent include a metal salt of a carboxylic acid. The metal salt of a carboxylic acid as referred to herein is preferably a metal salt of a carboxylic acid having 3 to 60 carbon atoms, and more preferably a metal salt of a fatty acid having 3 to 30 carbon atoms, and especially preferably 12 to 30 carbon atoms. In addition, examples thereof may include a metal salt of a dimer acid or a trimer acid of the aforementioned fatty acid, and a dicarboxylic acid having 3 to 30 carbon atoms. Of those, a metal salt of a fatty acid having 12 to 30 carbon atoms and a dicarboxylic acid having 3 to 30 carbon atoms is especially preferred.

Meanwhile, the metal constituting the metal salt is preferably an alkali metal or an alkaline earth metal, and in particular, an alkali metal is optimum.

In addition, examples of the extreme pressure agent other than those as mentioned above may include a sulfur-based extreme pressure agent, such as sulfurized fats and oils, a sulfurized fatty acid, a sulfurized ester, a sulfurized olefin, a dihydrocarbyl polysulfide, a thiocarbamate compound, a thioterpene compound, a dialkyl thiodipropionate compound, etc.

The content of the extreme pressure agent is typically 0.001 to 5 mass %, and especially preferably 0.005 to 3 mass % on the basis of the whole amount of the refrigerator oil from the standpoints of lubricating properties and stability.

The extreme pressure agent may be used solely, or may be used in combination of two or more thereof.

Examples of the oiliness agent include an aliphatic saturated or unsaturated monocarboxylic acid, such as stearic acid, oleic acid, etc.; a polymerized fatty acid, such as a dimer acid, a hydrogenated dimer acid, etc.; a hydroxy fatty acid, such as ricinoleic acid, 12-hydroxystearic acid, etc.; an aliphatic saturated or unsaturated monoalcohol, such as lauryl alcohol, oleyl alcohol, etc.; an aliphatic saturated or unsaturated monoamine, such as stearylamine, oleylamine, etc.; an aliphatic saturated or unsaturated monocarboxylic acid amide, such as lauric acid amide, oleic acid amide, etc.; a partial ester of a polyhydric alcohol, such as glycerin, sorbitol, etc., and an aliphatic saturated or unsaturated monocarboxylic acid; and the like.

Such an oiliness agent may be used solely, or may be used in combination of two or more thereof. The content thereof is chosen within the range of typically from 0.01 to 10 mass %, and preferably from 0.1 to 5 mass % on the basis of the whole amount of the refrigerator oil.

Examples of the oxygen scavenger include a sulfur-containing aromatic compound, such as 4,4'-thiobis(3-methyl-6-t-butylphenol), diphenyl sulfide, dioctyldiphenyl sulfide, a dialkyldiphenylene sulfide, benzothiophene, dibenzothiophene, phenothiazine, benzothiapyrane, thiapyrane, thianthrene, dibenzothiapyrane, diphenylene disulfide, etc.; an aliphatic unsaturated compound, such as various olefins, dienes, and trienes, etc.; a terpene compound having a double bond; and the like.

Examples of the metal inactivator may include an N—[N, N'-dialkyl(alkyl group having 3 to 12 carbon atoms)aminomethyl]triazole, and the like.

Examples of the rust preventive may include a metal sulfonate, an aliphatic amine compound, an organic phosphite ester, an organic phosphate ester, an organic sulfonic acid metal salt, an organic phosphoric acid metal salt, an alkenyl succinate ester, a polyhydric alcohol ester, and the like.

The refrigerator oil according to the present embodiment may further contain various other known additives within the range where the object of the present invention is not impaired.

[Refrigerant]

The refrigerator oil according to the present embodiment is one used in the refrigerant environment, and specifically, it is mixed with a refrigerant and used in a refrigerator. That is, in the present embodiment, the refrigerator oil is used in a form of a refrigerator oil composition containing the refrigerator oil and the refrigerant in a refrigerator. In the refrigerator oil composition, as for the amounts of the refrigerant and the refrigerator oil, a mass ratio of the refrigerant to the refrigerator oil is in the range of preferably from 99/1 to 10/90, and more preferably from 95/5 to 30/70. When this mass ratio falls within the aforementioned range, refrigeration capability and lubricating properties in the refrigerator can be made appropriate.

Examples of the refrigerant that is used include a fluorinated hydrocarbon refrigerant and one or more selected from, as a natural refrigerant, carbon dioxide, a hydrocarbon, and ammonia.

<Fluorinated Hydrocarbon Refrigerant>

Examples of the fluorinated hydrocarbon refrigerant include a saturated fluorinated hydrocarbon compound (HFC) and an unsaturated fluorinated hydrocarbon compound (HFO).

The saturated fluorinated hydrocarbon compound is typically a fluoride of an alkane having 1 to 4 carbon atoms, preferably a fluoride of an alkane having 1 to 3 carbon atoms, and more preferably a fluoride of an alkane having 1 to 2 carbon atoms (methane or ethane). Specifically, examples of the fluoride of methane or ethane include trifluoromethane (R23), difluoromethane (R32), 1,1-difluoroethane (R152a), 1,1,1-trifluoroethane (R143a), 1,1,2-trifluoroethane (R143), 1,1,1,2-tetrafluoroethane (R134a), 1,1,2,2-tetrafluoroethane (R134), and 1,1,1,2,2-pentafluoroethane (R125). Of those, difluoromethane and 1,1,1,2,2-pentafluoroethane are preferred.

Such a saturated fluorinated hydrocarbon compound may be used solely, or may be used in combination of two or more kinds thereof. Examples of the case of using two or more kinds of saturated fluorinated hydrocarbon compounds in combination include a mixed refrigerant of two or more kinds of saturated fluorinated hydrocarbon compounds having 1 to 3 carbon atoms; and a mixed refrigerant of two or more kinds of saturated fluorinated hydrocarbon compounds having 1 to 2 carbon atoms.

Specific examples of the mixed refrigerant include a mixture of R32 and R125 (R410A), a mixture of R125, R143a, and R134a (R404A), a mixture of R32, R125, and R134a (e.g., R407A, R407C, R407E, etc.), a mixture of R125 and R143a (R507A), and the like.

Examples of the unsaturated fluorinated hydrocarbon compound include those having a carbon-carbon double bond, such as a fluoride of chain olefin having 2 to 6 carbon atoms that is a straight-chain or branched, a fluoride of a cyclic olefin having 4 to 6 carbon atoms, etc.

More specifically, examples thereof include an ethylene having 1 to 3 fluorine atoms introduced thereinto, a propene having 1 to 5 fluorine atoms introduced thereinto, a butene having 1 to 7 fluorine atoms introduced thereinto, a pentene having 1 to 9 fluorine atoms introduced thereinto, a hexene having 1 to 11 fluorine atoms introduced thereinto, a cyclobutene having 1 to 5 fluorine atoms introduced thereinto, a cyclopentene having 1 to 7 fluorine atoms introduced thereinto, a cyclohexene having 1 to 9 fluorine atoms introduced thereinto, and the like.

Of those unsaturated fluorinated hydrocarbon compounds, a fluoride of propene is preferred, a propene having 3 to 5 fluorine atoms introduced thereinto is more preferred, and a propene having 4 fluorine atoms introduced thereinto is most preferred. Specifically, 1,3,3,3-tetrafluoropropene (HFO1234ze) and 2,3,3,3-tetrafluoropropene (HFO1234yf) are exemplified as a preferred compound.

Such an unsaturated fluorinated hydrocarbon compound may be used solely, or may be used in combination of two or more kinds thereof, or may be used in combination of other refrigerant than the unsaturated fluorinated hydrocarbon compound. Here, examples of the case of using a combination with other refrigerant than the unsaturated fluorinated hydrocarbon compound include a mixed refrigerant of a saturated fluorinated hydrocarbon compound and an unsaturated fluorinated hydrocarbon compound. Specific examples of the mixed refrigerant include a mixed refrigerant of R-32, HFO1234ze, and R152a (such as AC5; a mixing ratio is 13.23/76.20/9.96) and the like.

<Natural Refrigerant>

Examples of the natural refrigerant include carbon dioxide (carbonic acid gas), a hydrocarbon, such as propane, n-butane, isobutane, 2-methylbutane, n-pentane, cyclopentane, isobutane, normal butane, etc., and ammonia. Such a natural refrigerant may be used solely, or may be used in combination of two or more kinds thereof and it may be combined with other refrigerant other than the natural refrigerant. Here, examples of the case of using the natural refrigerant in combination with other refrigerant than the natural refrigerant include a mixed refrigerant in which the natural refrigerant is mixed with the saturated fluorinated hydrocarbon compound and/or the unsaturated fluorinated hydrocarbon compound. Specific examples of the mixed refrigerant include a mixed refrigerant of carbon dioxide, HFO1234ze, and R134a (such as AC6; a mixing ratio is 5.15/79.02/15.41) and the like.

[Refrigerator]

The refrigerator oil or refrigerator oil composition according to the present embodiment is one to be used upon being filled in the interior of a refrigerator. The refrigerator as referred to herein has a refrigeration cycle constituted of essential components including a compressor, a condenser, an expansion mechanism (e.g., an expansion valve, etc.), and an evaporator, or including a compressor, a condenser, an expansion mechanism, a dryer, and an evaporator. The refrigerator oil is one to be used for lubricating a sliding portion provided in, for example, a compressor, etc.

Although the sliding portion is not particularly limited, it is preferred that any of the sliding portion contains a metal, such as iron, etc., and it is preferred that metal-to-metal sliding takes place.

More specifically, the aforementioned refrigerator oil and refrigerator oil composition can be used for, for example, various refrigerator systems, hot water systems, and heating systems, such as a car air conditioner, a gas heat pump (GHP), an air conditioner, a fridge, an automatic vending machine, a showcase, a hot water supply machine, a floor heater, etc.

[Production Method of Refrigerator Oil]

The production method of a refrigerator oil according to an embodiment of the present invention is concerned with a method for producing the aforementioned refrigerator oil. Specifically, the present method is to produce a refrigerator oil by blending a base oil containing the aforementioned oxygen-containing organic compound with the aforementioned phosphorus-based compound. In the present embodiment, in addition to the phosphorus-based compound, any one or more selected from the aforementioned various additives may be blended. Detailed explanations of the base oil, the phosphorus-based compound, and the various additives are the same as those as mentioned above, and therefore, their explanations are omitted.

EXAMPLES

The present invention is hereunder more specifically described by reference to Examples, but it should be construed that the present invention is by no means limited by these Examples.

Properties of a base oil and various properties of a refrigerator oil and a refrigerator oil composition were determined according to the following manners.

(1) Kinematic viscosity at 40° C.:

The kinematic viscosity at 40° C. was measured using a glass-made capillary viscometer in conformity with JIS K2283-1983.

(2) Coefficient of friction of refrigerator oil composition in refrigerant environment:

The coefficient of friction in a sliding portion of each refrigerator oil composition was measured in an R410A (R32/R125=50/50) refrigerant environment using a sealing-type block-on-ring friction tester (LFW-1) under the following conditions.

Ring: FC250
Block: SKH51
Number of revolutions: 1,000 rpm
Running-in operation: Load 300 N×1 minute
Load: 500 N
Time: 30 minutes
Oil temperature: 80° C.
Refrigerant pressure: 0.3 MPa (3) Falex seizure load of refrigerator oil:

A pin/block was set, and the Falex seizure load of a sample oil (refrigerator oil) was measured under the following conditions.

Pin: AISI-3125
Block: AISI-1137
Running-in operation: Load 1,112 N×1 minute
Number of revolutions: 290 rpm
Oil temperature: Room temperature Examples 1 to 16 and Comparative Examples 1 to 4

A refrigerator oil of each of the Examples and Comparative Examples shown in Tables 1 and 2 and a refrigerator oil composition in which the refrigerator oil was used were prepared, respectively, and the seizure load relative to each of the refrigerator oils and the coefficient of friction relative to each of the refrigerator oil compositions were measured, respectively. The results are shown in Tables 1 and 2.

TABLE 1

|  |  | Example 1 | Example 2 | Example 3 | Example 4 | Example 5 | Example 6 |
|---|---|---|---|---|---|---|---|
| Refrigerator oil (mass %) | Base oil | 98.8 | 98.3 | 97.3 | 94.3 | 98.8 | 98.3 |
|  | Antioxidant | 0.3 | 0.3 | 0.3 | 0.3 | 0.3 | 0.3 |
|  | Acid scavenger | 0.3 | 0.3 | 0.3 | 0.3 | 0.3 | 0.3 |
|  | Defoaming agent | 0.1 | 0.1 | 0.1 | 0.1 | 0.1 | 0.1 |
|  | Phosphorus-based compound 1 | 0.5 | 1.0 | 2.0 | 5.0 | — | — |
|  | Phosphorus-based compound 2 | — | — | — | — | 0.5 | 1.0 |
|  | Phosphorus-based compound 3 | — | — | — | — | — | — |
|  | Phosphorus-based compound 4 | — | — | — | — | — | — |
|  | TCP | — | — | — | — | — | — |
| Evaluation results | Coefficient of friction | 0.056 | 0.057 | 0.052 | 0.047 | 0.059 | 0.059 |
|  | Seizure load (N) | 4420 | 4430 | 4300 | 7240 | 4330 | 4580 |

|  |  | Example 7 | Example 8 | Example 9 | Example 10 | Example 11 | Example 12 |
|---|---|---|---|---|---|---|---|
| Refrigerator oil (mass %) | Base oil | 97.3 | 94.3 | 98.8 | 98.3 | 97.3 | 94.3 |
|  | Antioxidant | 0.3 | 0.3 | 0.3 | 0.3 | 0.3 | 0.3 |
|  | Acid scavenger | 0.3 | 0.3 | 0.3 | 0.3 | 0.3 | 0.3 |
|  | Defoaming agent | 0.1 | 0.1 | 0.1 | 0.1 | 0.1 | 0.1 |
|  | Phosphorus-based compound 1 | — | — | — | — | — | — |
|  | Phosphorus-based compound 2 | 2.0 | 5.0 | — | — | — | — |
|  | Phosphorus-based compound 3 | — | — | 0.5 | 1.0 | 2.0 | 5.0 |
|  | Phosphorus-based compound 4 | — | — | — | — | — | — |
|  | TCP | — | — | — | — | — | — |
| Evaluation results | Coefficient of friction | 0.050 | 0.050 | 0.052 | 0.054 | 0.053 | 0.050 |
|  | Seizure load (N) | 5580 | 6980 | 3380 | 3910 | 4940 | 5720 |

TABLE 2

|  |  | Example 13 | Example 14 | Example 15 | Example 16 | Comparative Example 1 | Comparative Example 2 | Comparative Example 3 | Comparative Example 4 |
|---|---|---|---|---|---|---|---|---|---|
| Refrigerator oil (mass %) | Base oil | 98.8 | 98.3 | 97.3 | 94.3 | 98.8 | 98.3 | 97.3 | 94.3 |
|  | Antioxidant | 0.3 | 0.3 | 0.3 | 0.3 | 0.3 | 0.3 | 0.3 | 0.3 |
|  | Acid scavenger | 0.3 | 0.3 | 0.3 | 0.3 | 0.3 | 0.3 | 0.3 | 0.3 |
|  | Defoaming agent | 0.1 | 0.1 | 0.1 | 0.1 | 0.1 | 0.1 | 0.1 | 0.1 |
|  | Phosphorus-based compound 1 | — | — | — | — | — | — | — | — |
|  | Phosphorus-based compound 2 | — | — | — | — | — | — | — | — |
|  | Phosphorus-based compound 3 | — | — | — | — | — | — | — | — |
|  | Phosphorus-based compound 4 | 0.5 | 1.0 | 2.0 | 5.0 | — | — | — | — |
|  | TCP | — | — | — | — | 0.5 | 1.0 | 2.0 | 5.0 |
| Evaluation results | Coefficient of friction | 0.059 | 0.067 | 0.058 | 0.059 | 0.066 | 0.074 | 0.067 | 0.068 |
|  | Seizure load (N) | 3450 | 3630 | 4030 | 6010 | 3000 | 3300 | 3700 | 4610 |

In each of the Examples and Comparative Examples, the base oil and the additives (commercially available products) are as follows.

Base oil: A copolymer of ethyl vinyl ether and isobutyl vinyl ether (molar ratio: 9:1, kinematic viscosity at 40° C.: 63.3 mm²/s), in which both ends thereof are represented by the general formula (A-1-i) and the general formula (A-1-ii), respectively; all of $R^{6a}$ to $R^{8a}$ and $R^{11a}$ to $R^{13a}$ are a hydrogen atom; all of r1 and r2 are 0; and $R^{10a}$ and $R^{15a}$ are each an ethyl group or an isobutyl group.

Antioxidant: 2.6.-Di-tert-butyl-4-methylphenol (DBPC)
Acid scavenger: 2-Ethylhexyl glycidyl ether
Defoaming agent: Silicone-based defoaming agent
Phosphorus-based compound 1: A compound represented by the general formula (5) in which n is 1.
Phosphorus-based compound 2: A mixture of compounds represented by the general formula (5) in which n is 1 to 8.
Phosphorus-based compound 3: A compound represented by the general formula (6)
Phosphorus-based compound 4: A mixture of compounds represented by the general formula (1) in which all of $R^1$, $R^3$, $R^5$, and $R^7$ are a hydrogen atom; $R^2$, $R^4$, $R^6$, and $R^8$ are each an alkyl group having 1 to 20 carbon atoms; Ar is a divalent hydrocarbon group having 2 to 20 carbon atoms; and n is 1 to 8.
TCP: Tricresyl Phosphate As shown in Examples 1 to 16 and Comparative Examples 1 to 4, by containing each of the phosphorus-based compounds 1 to 4 each having 2 or more phosphorus atoms in a molecule thereof, the coefficient of friction in the sliding portion in the refrigerant environment could be reduced as compared with the case of containing TCP in the same content. In addition, as shown in Examples 1 to 16 and Comparative Examples 1 to 4, even in the case of containing each of the phosphorus-based compounds 1 to 4 each having 2 or more phosphorus atoms in a molecule thereof, the seizure load of the refrigerator oil was equal to or more than that in the case of containing TCP in the same content.

The invention claimed is:

1. A refrigerator oil, comprising:
a base oil comprising an oxygen-containing organic compound, wherein the oxygen-containing organic compound comprises at least one polyvinyl ether compound; and
a phosphorus-based compound represented by formula (1):

$$\text{(1)}$$

wherein:
n represents an integer of 1 to 10;
$R^1$ to $R^8$ each independently represent a hydrogen atom or an alkyl group having 1 to 20 carbon atoms; and
Ar represents a divalent hydrocarbon group having 2 to 20 carbon atoms.

2. The refrigerator oil according to claim 1, wherein the content of the phosphorus-based compound is 0.3 to 10.0 mass % relative to the whole amount of the refrigerator oil.

3. The refrigerator oil according to claim 1, wherein the oxygen-containing organic compound further comprises at least one selected from the group consisting of a polyoxyalkylene glycol compound, a copolymer of a poly(oxy)alkylene glycol or a monoether thereof and a polyvinyl ether, and a polyol ester compound.

4. The refrigerator oil according to claim 1, wherein in the formula (1), Ar comprises an arylene group.

5. The refrigerator oil according to claim 1, wherein in the formula (1), Ar is represented by formula (2) or formula (3):

$$\text{(2)}$$

$$\text{(3)}$$

6. The refrigerator oil according to claim 1, wherein the phosphorus-based compound is at least one selected from the group consisting of a compound of formula (5) and a compound of formula (6):

$$\text{(5)}$$

$$\text{(6)}$$

wherein n represents an integer of 1 to 10.

7. The refrigerator oil according to claim 1, wherein in the formula (1), n is 1.

8. A refrigerator oil composition, comprising a refrigerant and the refrigerator oil according of claim 1.

9. The refrigerator oil composition according to claim 8, wherein the refrigerant comprises at least one selected from the group consisting of a fluorinated hydrocarbon, carbon dioxide, a hydrocarbon, and ammonia.

10. The refrigerator oil composition according to claim 9, wherein the refrigerant comprises a mixed refrigerant of two or more saturated fluorinated hydrocarbon compounds having 1 to 3 carbon atoms.

11. A refrigerator, comprising the refrigerator oil according to claim 1.

12. A method for producing a refrigerator oil comprising, the method comprising blending a base oil comprising an oxygen-containing organic compound with a phosphorus-based compound represented by formula (1), to produce a refrigerator oil, wherein the oxygen-containing organic compound comprises at least one polyvinyl ether compound:

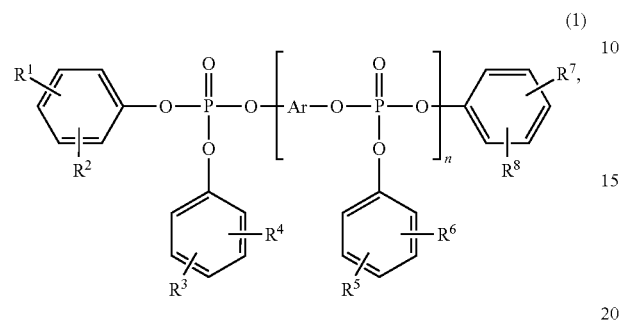

(1)

wherein:
n represents an integer of 1 to 10;
$R^1$ to $R^8$ each independently represent a hydrogen atom or an alkyl group having 1 to 20 carbon atoms; and
Ar represents a divalent hydrocarbon group having 2 to 20 carbon atoms.

13. A refrigerator, comprising the refrigerator oil composition according to claim 8.

* * * * *